E. R. MATTERS.
EYEGLASS CHAIN ADJUSTER.
APPLICATION FILED SEPT. 14, 1910.

1,001,665.                                      Patented Aug. 29, 1911.

Edward R. Matters.
Inventor

Witnesses                                    by C. A. Snow & Co.
                                                      Attorneys

UNITED STATES PATENT OFFICE.

EDWARD R. MATTERS, OF NEOSHO, MISSOURI.

EYEGLASS-CHAIN ADJUSTER.

1,001,665.      Specification of Letters Patent.      Patented Aug. 29, 1911.

Application filed September 14, 1910. Serial No. 582,042.

*To all whom it may concern:*

Be it known that I, EDWARD R. MATTERS, a citizen of the United States, residing at Neosho, in the county of Newton and State of Missouri, have invented a new and useful Eyeglass-Chain Adjuster, of which the following is a specification.

The device forming the subject matter of this application is adapted to be employed primarily, although not exclusively, as an adjuster, whereby the length of the cord or other flexible element upon a pair of eyeglasses, may be increased or decreased.

It is the object of this invention to provide novel means for mounting the winding member for rotation, and to provide novel means for limiting and controlling the rotation of said winding member.

Another object of the invention is to improve generally, devices of the class to which this invention appertains.

Another object of the invention is to provide novel means for assembling and connecting the several constituent elements of the device.

The drawings show typical embodiments merely, and it is to be understood that changes, properly falling within the scope of what is claimed, may be made without departing from the spirit of the invention.

Figure 1:
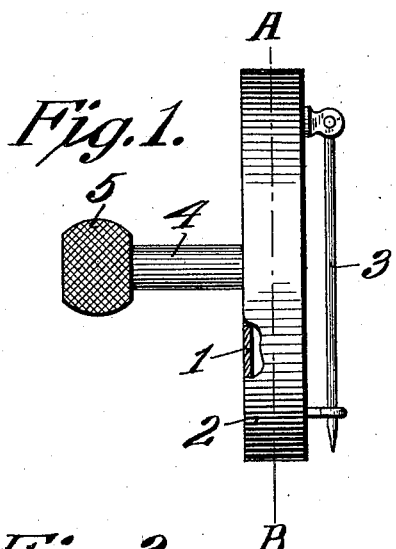
Figure 2:
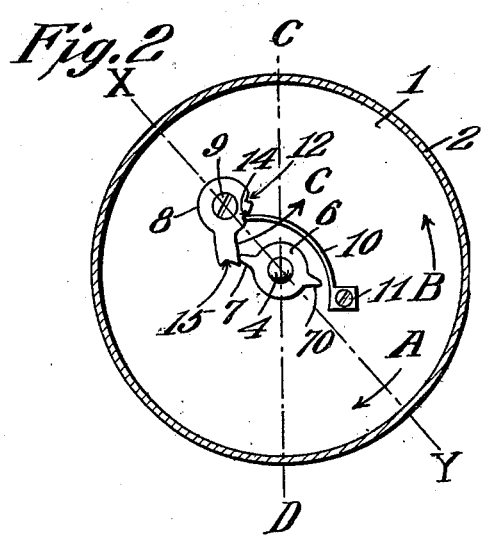
Figure 3:
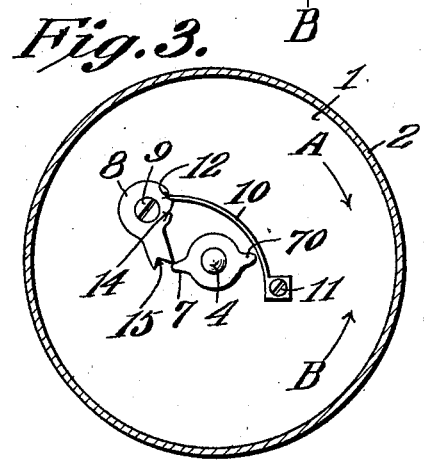
Figure 4:
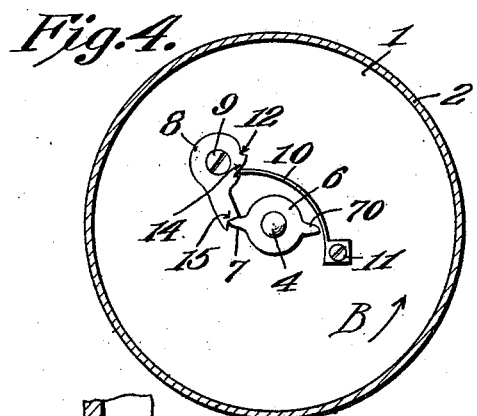
Figure 6:
Figure 5:
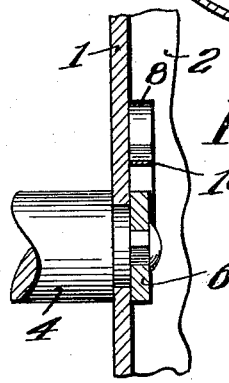

In the drawings,—Figure 1 shows the invention in side elevation, parts being broken away; Figs. 2, 3 and 4 are sections upon the line A—B of Fig. 1; Fig. 5 is a fragmental section upon the line C—D of Fig. 4; and Fig. 6 is a front elevation of the pawl.

The invention includes, as a primary and fundamental element, a face plate 1, of any desired contour. This face plate 1 may be assembled with a case 2, upon the rear of which is a pin 3 or like device, whereby the structure may be mounted upon the garment of the person using and operating the structure.

Mounted for rotation in the face plate 1, and outstanding terminally therefrom, is a shaft 4, provided at its free end with a milled head 5. To the other end of the shaft 4 is secured a ratchet head 6, provided with two or more outstanding teeth 7 and 70. The head 6 bears against the inner face of the plate 1, and constitutes a means for holding the shaft 4 in place in the plate 1 for rotation. The shaft 4 together with the head 6 constitutes what, for convenience, will be denominated hereinafter the winding member of the structure.

A pawl 8 is provided, this pawl 8 being pivoted upon a screw 9 or other connecting element, inserted into the rear face of the plate 1 and housed within the contour of the case 2.

A spring 10 is included in the structure, this spring 10 being secured at one end to the plate 1, by means of a screw 11 or the like. The free end of the spring 10 is adapted to register successively in seats 12 and 14, fashioned in the edge of the pawl 8, at one side thereof. In the other end face of the pawl 8 there is a notch 15, which, under circumstances to be described hereinafter, is adapted to engage the teeth of the head 6, to hold the winding member against rotation. The cord whereby the eye glasses are suspended, is wound on the shaft 4, the shaft being rotated by the milled head 5. The distance from the center of the screw 9 to the base of the notch 15 in the pawl 8, plus the distance from the center of the shaft 4 to the extremity of either of the teeth 7 or 70, is greater than the distance from the center of the shaft 4 to the center of the screw 9 measured in a straight-line (see Fig. 4).

Referring to Fig. 2, the tooth 7 is shown as touching one side of the pawl 8, the spring 10 being under tension, and terminally engaged in the seat 14 of the pawl 8. If the shaft 4 be rotated in the direction of the arrow A, the tooth 7 will be withdrawn from the pawl 8, the spring 10 (being under tension) causing the pawl to swing in the direction of the arrow C until the free end of the pawl 8 is slightly beyond the line of centers X—Y of the pivot elements 4 and 9. The shaft 4 may now be freely rotated in the direction of the arrow A, unreeling the eye glass cord to the desired extent, the teeth 7 and 70 slipping over the free end of the pawl 8. When the eye glass cord has been unreeled to the desired extent, the direction of rotation of the shaft may be reversed, that is the shaft 4 may be rotated through a small arc in the direction of the arrow B, until the tooth 7 is positioned as shown in Fig. 2. A further rotation of the shaft 4 in the direction of the arrow B will cause the tooth 7 to move into the position shown in Fig. 3. As the pawl 8 is tilted from the position shown in Fig. 2 to that shown in Fig. 3, the free end of the spring 10 will ride out of the seat 14 and register in the seat 12. The pawl 8 will thus be held in the position shown in Fig. 3. If the shaft 4 be now rotated through a small arc in the direction of the arrow A, the parts will be positioned as shown in Fig. 4, the tooth 7 locking in the notch 15 in the end of the pawl 8, and holding the shaft 4 against rotation. It is to be noted that when the shaft 4 is rotated from the position shown in Fig. 3 to that shown in Fig. 4, the free end of the spring 10 will ride over the projection 25 which separates the seat 12 from the seat 14. When the parts are positioned as shown in Fig. 4, however, the free end of the spring 10 does not register in the seat 14, but rests upon the inclined edge 26 which forms one wall of the seat 14. Presupposing the parts to be as shown in Fig. 4, if the shaft 4 be rotated through a small arc in the direction of the arrow B, the free end of the spring 10 will move along the inclined edge 26, registering in the seat 12 and swinging the free end of the pawl 8 in the direction of the arrow C, to one side of the line of centers X—Y, whereupon the shaft 4 may be rotated freely in the direction of the arrow A. By referring to Fig. 2 it will be seen that the shaft 4 may be rotated freely in the direction of the arrow A, owing to the fact that the spring 10 will swing the free end of the pawl 8 in the direction of the arrow C, to one side of the line of centers X—Y, the spring 10 being engaged in the seat 14. Referring to Fig. 3, it will be seen that the shaft 4 may be rotated freely in the direction of the arrow B, the end of the spring 10 being engaged in the seat 12. However, when the shaft 4 has been rotated in either direction, to the desired extent, thus reeling in or unreeling the eye-glass cord, the parts may be locked as shown in Fig. 4.

Having thus described the invention, what is claimed is:—

In a device of the class described, a rotatable winding member; a ratchet secured thereto; a pawl to engage the ratchet and provided with seats; the teeth of the ratchet being spaced, to permit the free end of the pawl to swing across the line of centers of suspension of the ratchet and the pawl; and a spring engaging the seats successively to hold the free end of the pawl upon opposite sides of the line of centers, the free end of the pawl, when upon one side of said line, being positioned for locking engagement with the ratchet, and when upon the other side of said line, being tiltable by the ratchet into ratchet-engaging position; the movement of the free end of the pawl across said line, serving to move the spring from seat to seat.

In testimony that I claim the foregoing as my own, I have hereto affixed my signature in the presence of two witnesses.

EDWARD R. MATTERS.

Witnesses:
THOMAS M. SAXTON,
JAY A. SEAGROVE.